C. A. CASE.
BLAZING TWYER.
APPLICATION FILED MAY 24, 1907.

985,394.

Patented Feb. 28, 1911.
6 SHEETS—SHEET 1.

C. A. CASE.
BLAZING TWYER.
APPLICATION FILED MAY 24, 1907.

985,394.

Patented Feb. 28, 1911.
6 SHEETS—SHEET 2.

WITNESSES:
M. H. Cook
John J. Millin

INVENTOR
Charles A. Case
BY
Aitde Bonneille
ATTORNEY

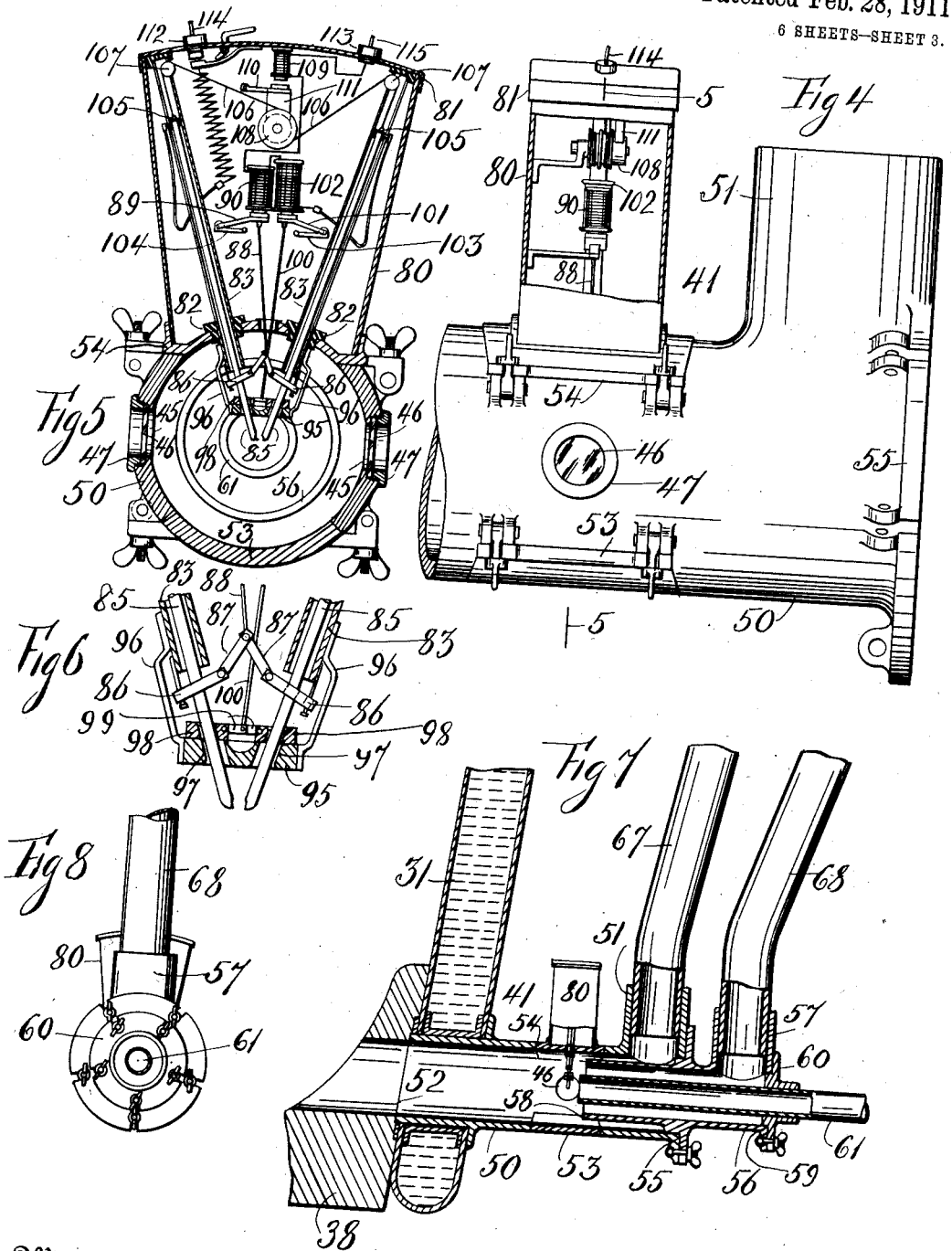

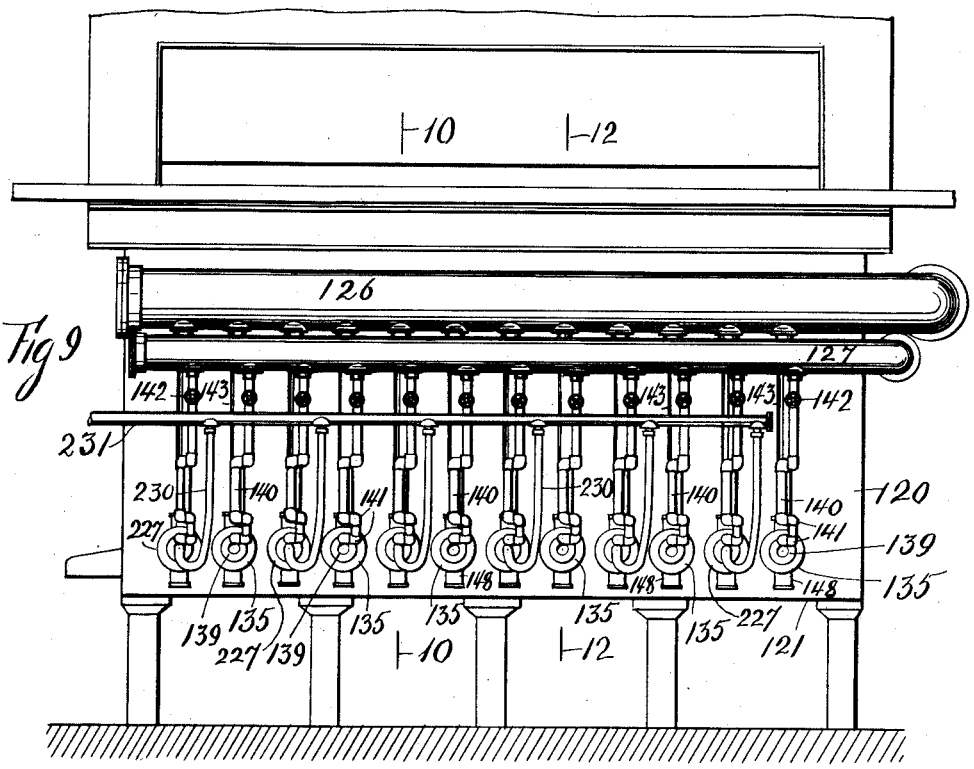
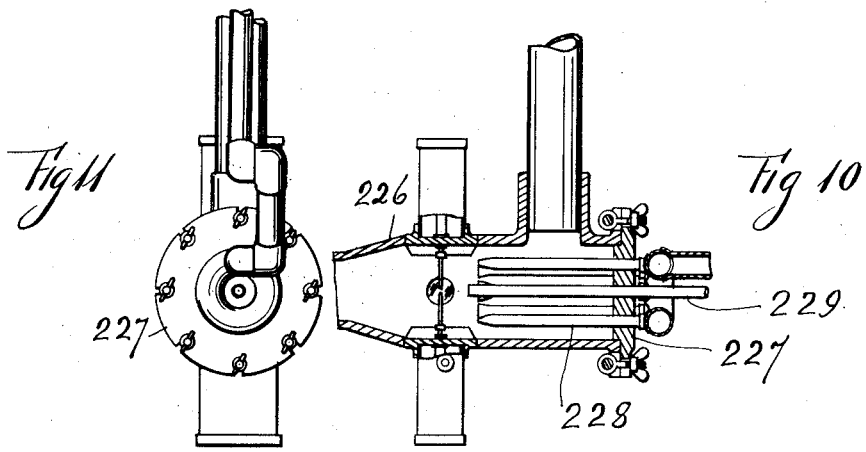

C. A. CASE.
BLAZING TWYER.
APPLICATION FILED MAY 24, 1907.
985,394.
Patented Feb. 28, 1911.
6 SHEETS—SHEET 5.
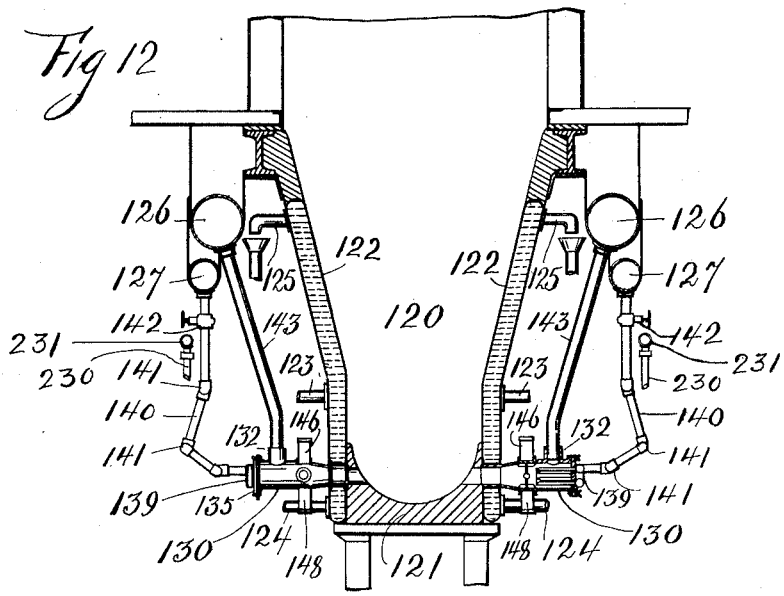
WITNESSES:
M. H. Cook
John J. Millin
INVENTOR
Charles A. Case
BY
A. A. de Bonneville
ATTORNEY

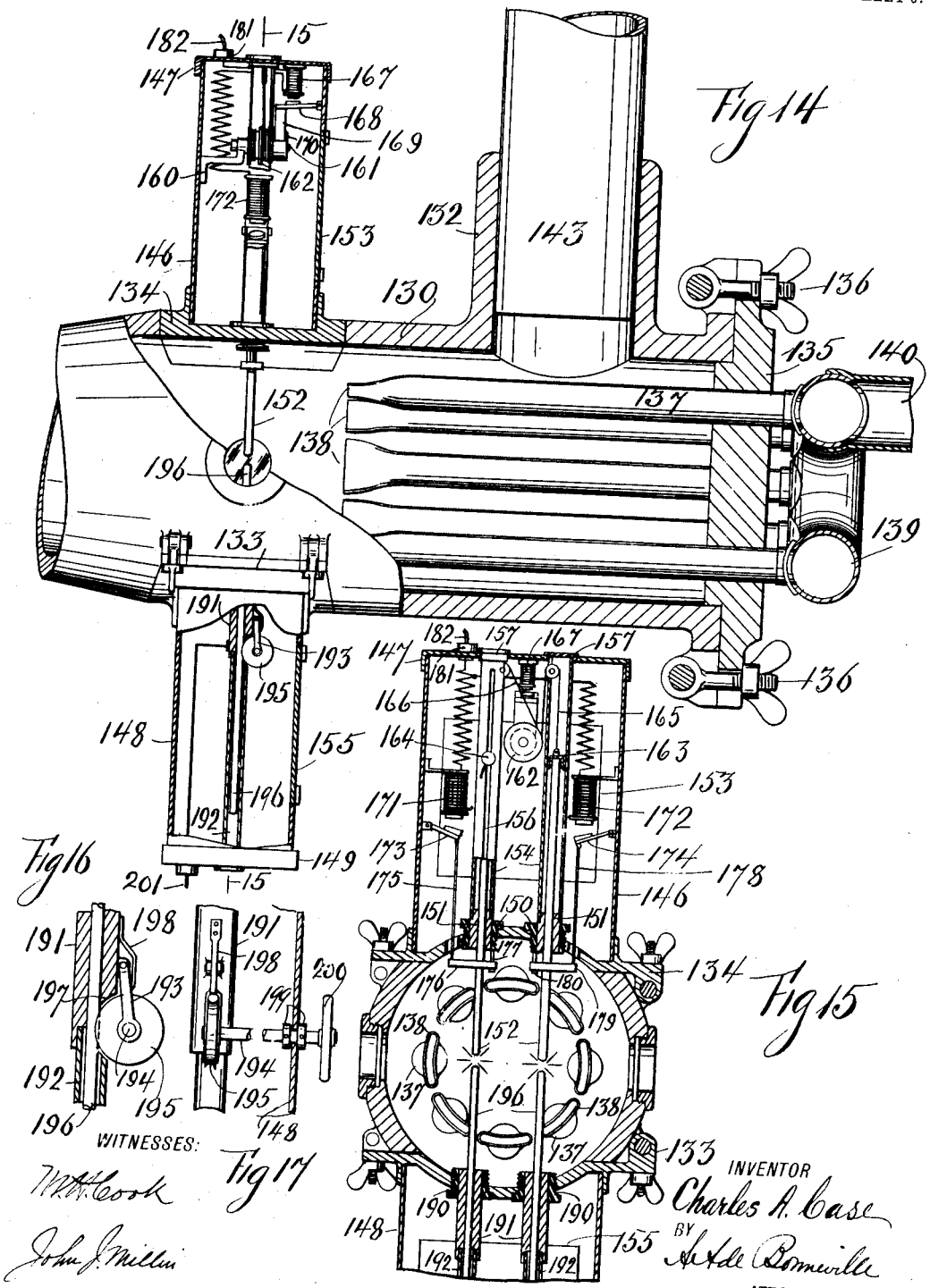

UNITED STATES PATENT OFFICE.

CHARLES A. CASE, OF NEW YORK, N. Y.

BLAZING TWYER.

985,394.

Specification of Letters Patent.  Patented Feb. 28, 1911.

Application filed May 24, 1907. Serial No. 375,498.

*To all whom it may concern:*

Be it known that I, CHARLES A. CASE, a citizen of the United States, and a resident of the borough of Manhattan, city of New York, in the county of New York and State of New York, have invented certain new and useful Improvements in Blazing Twyers, of which the following is a specification.

This invention relates to twyers. Its object is to produce a blazing twyer which can be attached to a furnace and the like to secure economy.

Figure 1:
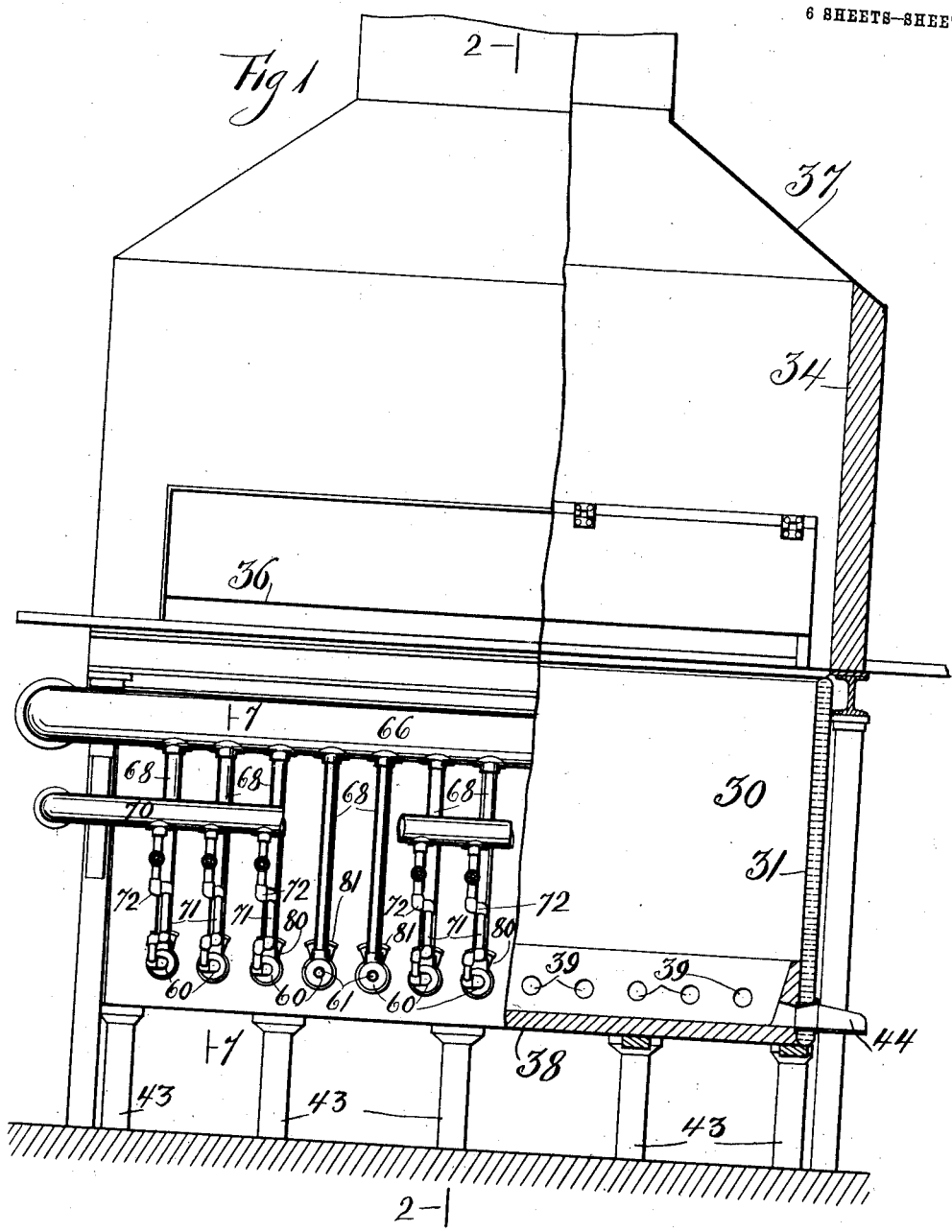
Figure 2:
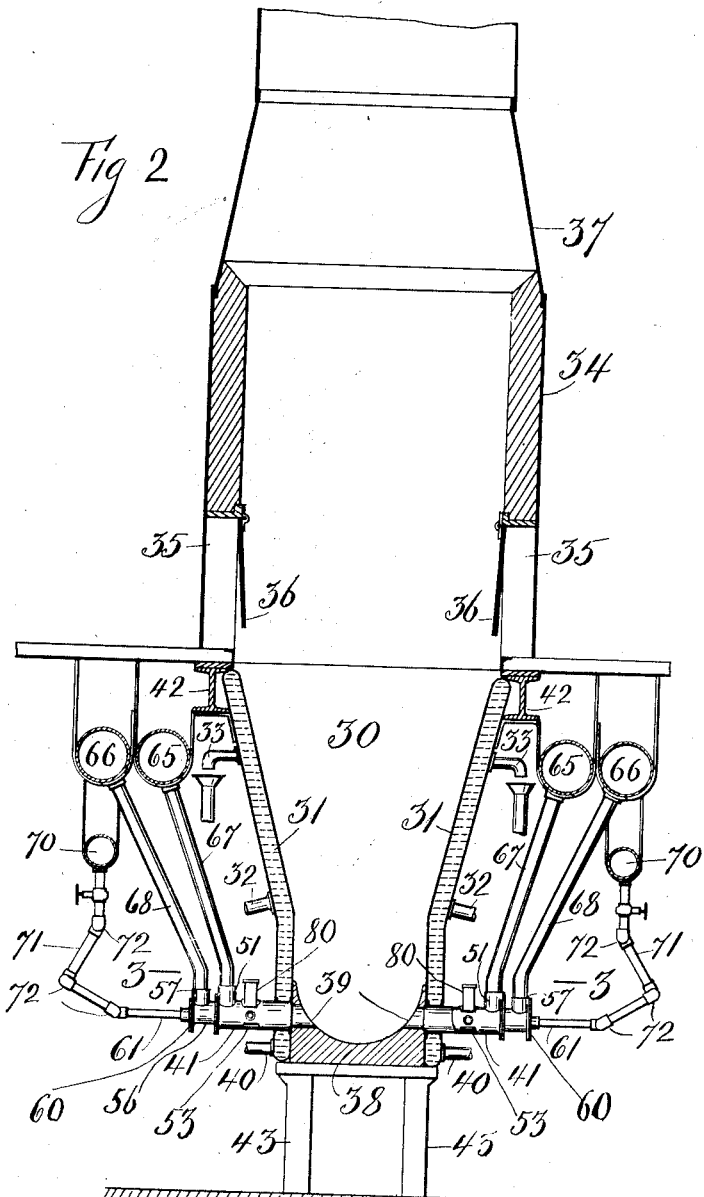
Figure 3:
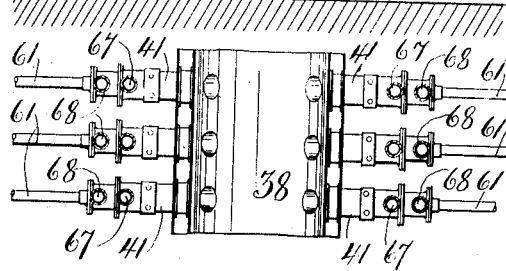

Figure 1 represents a side elevation partly in section of an ore smelting furnace exemplifying the invention, Fig. 2 shows a partial section of Fig. 1 on the line 2, 2, Fig. 3 is a section of Fig. 2 on the line 3, 3, Fig. 4 is an enlarged portion of Fig. 2, Fig. 5 is a section of Fig. 4 on the line 5, 5, Fig. 6 represents an enlarged portion of Fig. 5, Fig. 7 represents an enlarged section of a portion of Fig. 1 on the line 7, 7, Fig. 8 is a right hand end view of Fig. 7, Fig. 9 shows a partial side elevation of a modification of the invention, Fig. 10 shows a partial enlarged section of Fig. 9 on the line 10, 10, Fig. 11 is a front view of the twyers shown in Fig. 10, with its appurtenances, Fig. 12 represents a partial section of Fig. 9 on the line 12, 12, Fig. 13 is an enlargement of a portion of Fig. 12, Fig. 14 is a further enlargement of a portion of Fig. 12, Fig. 15 is a section of Fig. 14 on the line 15, 15, Fig. 16 shows an enlargement of a portion of Fig. 14 and Fig. 17 is a side view of Fig. 16, showing also a partial section of the casing inclosing the same.

A furnace is represented at 30, the walls of which comprise water jackets 31, with the water inlets 32 and 40 and water outlets 33. A receiving dome 34 has the charging openings 35 with doors 36, and stack 37. The bottom 38 of the furnace has openings 39, which connect with the twyers 41 that extend through the water jackets 31. The dome 34 of the furnace is supported on the beams 42, and the bottom of the furnace is carried on the posts 43. A discharging spout 44 extends from the bottom of the furnace.

The twyers which constitute the essential points of the novelty of the invention each consist of the elbow-shaped outer shell 50, with an inlet nozzle 51 and outlet end 52. To the shell 50 is hinged the bottom cleaning door 53, and the swinging cover 54. In the shell 50 of the twyer are formed openings 45 with isinglass covers 46, the latter being held in place by the screw plugs 47. To each swinging cover 54 is connected the electric arc appurtenances to be described. The outer end of the shell 50 terminates in a flange 55, to which is bolted a low pressure nozzle 56, having the inlet 57 and outlet 58. To a flange 59 on the low pressure nozzle 56 is bolted a cap 60, that carries a fuel nozzle 61. High pressure air supply pipes 65 are located adjacent to the furnace 30, as well as the low pressure air supply pipes 66. The pipes 65 are connected with the inlets 51 by means of the high pressure conduits 67, and the pipes 66 are connected with the inlets 57 by means of the low pressure conduits 68. Fuel pipes 70 are suspended under the pipes 66, and are connected with the fuel nozzles 61, by means of piping 71, which latter have connected up with them the swinging joints 72.

From the swinging door 54 of each twyer extends a casing 80 with a cap 81. A pair of plugs 82 of insulating material are secured to the said cover 54, in which are held tubes 83 for the carbons 85. A clutch ring 86 with an internal diameter somewhat larger than the carbons surrounds the latter. The rings 86 are pinned to the links 87 both of which are pinned to the link 88, and the latter in turn is pinned to the armature 89 of the magnet 90. A spreader plate 95 is located below and connected with the tubes 83 by means of brackets 96, and has opening 97 for the carbons 85. Sliding blocks 98 with openings for the said carbons are located on the upper face of the plate 95. Links 99 are pinned to the blocks 98 and are each in turn pinned to a link 100, which latter is connected with the armature 101 of the magnet 102. The armature 101 is fulcrumed to a bracket 103 which also constitutes a stop to prevent the armature dropping too far from its magnet. The armature 89 is fulcrumed to a bracket 104 similar to the bracket 103. Each of the carbons 85 is held at its upper end by a cap 105, and a chain or wire 106 extends from said cap 105, leads over a sheave 107, and from thence the chains are wound around a drum 108, one of the said wires 106 encircling the said drum from the bottom up, and the other from the top down. A magnet 109 is located adjacent to the drum 108. The armature 110 of the magnet 109 has a brake shoe 111 which can bear on the said drum 108. Binding posts 112 and 113 are shown for the feed wires 114, 115. The wire 114 is connected with one of the carbons 85, and all the magnets are in circuit with the wire 115. A source of electric current not shown is connected with the wires 114 and 115.

In Figs. 9 to 17 which show modifications of the invention I have represented a furnace 120, with the bottom 121, water jackets 122 having the inlet water pipes 123, 124 and outlet pipes 125. Low pressure air supply pipes 126, and high pressure air supply pipes 127, are located adjacent to the furnace as shown. Twyers 130 with the outlet ends 131 and inlet nozzles 132 enter the furnace through the water jackets 122. The twyers each have a bottom hinged door 133 and a top hinged door 134. To the outer ends of each twyer is bolted a bonnet 135 with the swinging bolts 136. Through the bonnets 135 extend the jet pipes 137, with the flattened tip ends 138. The said jet pipes connect with the manifold ring 139, and between the latter and high pressure supply pipes 127 extends the piping 140 with the swinging joints 141 and valves 142. Between the lower pressure pipes 126 and the inlets 132 of the twyers 130 extend the conduits 143.

To the hinged cover 134 is connected the casing 146 with the cap 147, and to the bottom hinged cover 133 is connected the casing 148, with the cap 149. A door 153 is hinged over an opening in the casing 146, and a door 155 is hinged to the casing 148. Guide plugs 150 of insulating material are fastened in the cover 134, and guides 151 for the carbons 152 are held in the said plugs. Tubes 154 with longitudinal slots 156 and caps 157 extend from the guides 151. To the wall of the casing 146 is fastened a bracket 160, that supports a pin 161, on which latter is journaled a double drum 162. To the top end of each of the carbons 152 is clamped the cap 163 with a binding post 164. Chains 165, 166 extend from the caps 163 and wind around the drum 162, for the purpose of supporting the carbons 152. A magnet 167 is fastened to the cap 147, and has its armature 168 fulcrumed to the side of the casing 146. From the armature 168 extends the brake shoe 169, that can bear on a smooth turned end 170 of the drum 162. To the sides of the casing 146 are attached the magnets 171, 172 and below them are respectively fulcrumed the armatures 173, 174. To the armature 173 is pinned the link 175, which in turn is pinned to the clutch ring 176 for one of the carbons 152. The said ring is movably supported on the spindle 177. To the armature 174 is pinned the link 178 which is pinned to the clutch ring 179, and the latter is movably supported on the spindle 180. A binding post 181 secures the feed wire 182 which is in circuit with the three magnets 167, 171, 172, and both the binding posts 164 of the caps 163.

In the lower hinged door 133 are fastened the guide plugs 190 that hold the guides 191, from which latter extend the tubes 192. To each one of the guides 191 is fulcrumed a forked arm 193 with a pin 194. A brake wheel 195 is supported on the pin 194 and can bear on the lower carbons 196 through openings 197 formed in the guides 191 and tubes 192. A spring 198 extends from each one of the guides 191 and bears on the forked arms 193. The pin 194 extends through the wall of the casing 148, the hole in the casing being somewhat larger than the said pin 194. A pair of collars 199 maintain the pin 194 in proper position, and a hand wheel 200 is fastened to the outer end of the pin 194. A feed wire 201 is in circuit with both the lower carbons 196. A source of electric current is connected with the wires 182 and 201.

In the modification of the invention just described and shown in detail in Fig. 14, it will be noted that no means are connected with the twyers 130 for a fuel supply.

A further modification of the invention is shown in detail in Figs. 10 and 11 in which twyers 226 with bonnets 227 have jet pipes 228 similar to the pipes 137, but have in addition thereto fuel nozzles 229 that are connected to fuel pipes 231 with flexible connections as shown at 230.

To operate the furnace and referring first to Figs. 1 to 8 a charge of ore with coke and the like, is introduced through the openings 35. Then air of high pressure is forced into and through the pipes 65, and air of lower pressure is forced into and through the pipes 66, by means of which a jet of air is blown into and through the shell 50 of each of the twyers 41. The air jet has a tubular core of air at a low pressure and a circumferential zone of air at high pressure around said core. At the same time fuel, such as oil, gases and the like is forced through the fuel nozzles 61, which enters the low pressure core of air for a short distance and is then lighted by means of the arc extending between the ends of the carbons 85. The lighted fuel on its way through the twyers is fed by the core of low pressure air to support combustion, and the surrounding zone of high pressure air, protects the shell of the twyers from burning, and supplies the necessary oxygen for the reduction of the ores in the furnace. The ignited fuel in the bottom of the furnace keeps the latter at the required degree of heat to produce a continuous flow of the molten product to the spout 44 where it is discharged.

With the modified form of the invention it is evident that a blast of air heated by a blazing electric arc can be introduced into the bottom of the furnace without any fuel supply.

It is evident that the twyers with their appurtenances could produce a jet with or without the fuel, and at the same time omit the core of low pressure air, retaining the said zone of high pressure. When the low pressure air is omitted a fuel supply can be made to constitute the core of the jet of air.

Having described my invention, I claim:

1. In a twyer the combination of means to force a jet of air therethrough having a core of low pressure and a zone of high pressure, and means to heat the jet of air.

2. In a twyer the combination of means to force a jet of air therethrough and means to form an electric arc within the twyer to heat the jet and form a blaze in the twyer.

3. In a twyer the combination of means to force a jet of air therethrough, means to force a fuel supply in the said jet of air, and means to produce an electric arc in the jet within the twyer to form a blazing twyer.

4. In a twyer the combination of means to force a jet of air therethrough having a core of low pressure and a zone of high pressure, means to supply the jet with fuel in the twyer, and means to ignite the fuel to form a blazing jet in said twyer.

5. The combination of a furnace, twyers connected thereto, means to force a jet of air through each twyer having an outer zone of high pressure air and a core of low pressure air and means to heat the jet of air in each twyer.

6. The combination of a furnace, twyers connected thereto, means to force a jet of air through each twyer, and means to form an electric arc in the path of said jet of air within the twyers.

7. The combination of a furnace, twyers connected thereto, means to force a jet of air through each twyer having an outer zone of high pressure air and a core of lower pressure air, and means to form an electric arc in the said jet of air.

8. The combination of a furnace, twyers connected thereto, a conduit for air of high pressure connected to each twyer, a nozzle in the twyer, a conduit for air of lower pressure connected with the said nozzle, and means to form an electric arc in the twyer in the path of the air forced therethrough.

9. The combination of a furnace, twyers connected thereto, means to force a jet of air through each twyer and into the furnace, the said jet having a core of air of low pressure, and a zone of air of high pressure around said core, means to force fuel into the core of said jet, and means to ignite the said fuel.

10. The combination of a furnace, twyers connected thereto, a conduit for air of high pressure connected to the shell of each twyer, a nozzle extending into the shell of each twyer, a conduit for air of low pressure connected with the said nozzle, a fuel nozzle inserted in the said nozzle for air of low pressure, a conduit for fuel connected to the fuel nozzle, a pair of carbons in each twyer opposite the fuel nozzle, and means to form an electric arc between the carbons to ignite the fuel forced through the fuel nozzle.

11. The combination of a furnace, twyers connected thereto, means to force a jet of air through each twyer and into the furnace, the said jet having a core of air of low pressure, and a zone of high pressure air around said core, a pair of carbons in the path of the jet of air, means to enable the ends of the carbons to make contact with each other, and means to spread the ends of the carbons, and a source of electric current for the carbons.

12. The combination of a furnace, twyers connected thereto, means to force a jet of air through each twyer, the said jet having a core of low pressure and a zone of high pressure around said core, a pair of inclined carbons in the path of the jet of air, clutch rings for the ends of the carbons, electric means connected with the rings to feed the carbons toward each other, a spreader for the carbons, blocks on the spreader to separate the carbons and electric means to operate the blocks.

13. The combination of a furnace, twyers connected thereto, jet pipes extending into each twyer, means to force air of high pressure through the said jet pipes to form a zone of high pressure air in the body of the twyer, a nozzle connected to each twyer entering the same between the outer end thereof and the ends of the said jet pipes, and a conduit for air of low pressure connected with said nozzle to form a core of low pressure air inside the said zone.

14. The combination of a furnace, twyers connected thereto, jet pipes extending into each twyer, means to force air of high pressure through the said jet pipes to form a zone of high pressure air in the body of the twyer, a nozzle connected to each twyer entering the same between the outer end thereof and the ends of the said jet pipes, a conduit for air of low pressure connected with said nozzle to form a core of low pressure air in said zone, and means to heat the jet in the twyer.

15. The combination of a furnace, twyers connected thereto, jet pipes extending into each twyer, means to force air of high pressure through the said jet pipes to form a zone of high pressure air in the body of the twyer, a nozzle connected to each twyer entering the same between the outer end thereof and the ends of the said jet pipes, a conduit for air of lower pressure connected with said nozzle to form a core of low pressure air in said zone, and carbons in the twyer in the path of the jet, means to connect an electric current with the carbons to heat the said jet of air.

16. The combination of a furnace, twyers connected thereto, jet pipes extending into each twyer, means to force air of high pressure through the said jet pipes to form a zone of high pressure air in the body of the twyer, a nozzle connected to each twyer entering the same between the outer end thereof and the ends of the said jet pipes, a conduit for air of low pressure connected with said nozzle to form a core of low pressure air in the said zone, a fuel pipe extending into the twyer to force fuel into said core, and means connected with the twyer to ignite said fuel.

17. The combination of a furnace, twyers connected thereto, means to force a jet of air through each twyer, means to also force a fuel supply through some of the twyers to mix with the jet of air therein and heating means extending into each twyer to ignite the fuel therein.

18. The combination of a furnace, twyers connected thereto, means to force a jet of air through each twyer having a core of low pressure and a zone of high pressure air, means to force fuel into some of the twyers and into the cores of the low pressure air therein, a pair of carbons in each twyer to ignite the fuel in the twyers having the fuel supply, and to heat the air in the other twyers.

19. In a twyer the combination of means to force a zone of air of high pressure therethrough and means within the twyer to heat the zone of air.

Signed at the borough of Manhattan, city of New York in the county of New York and State of New York, this 23d day of May, A. D. 1907.

CHARLES A. CASE.

Witnesses:
MARTIN ZIMANSKY,
CHAS. C. GILL.